No. 728,359. Patented May 19, 1903.

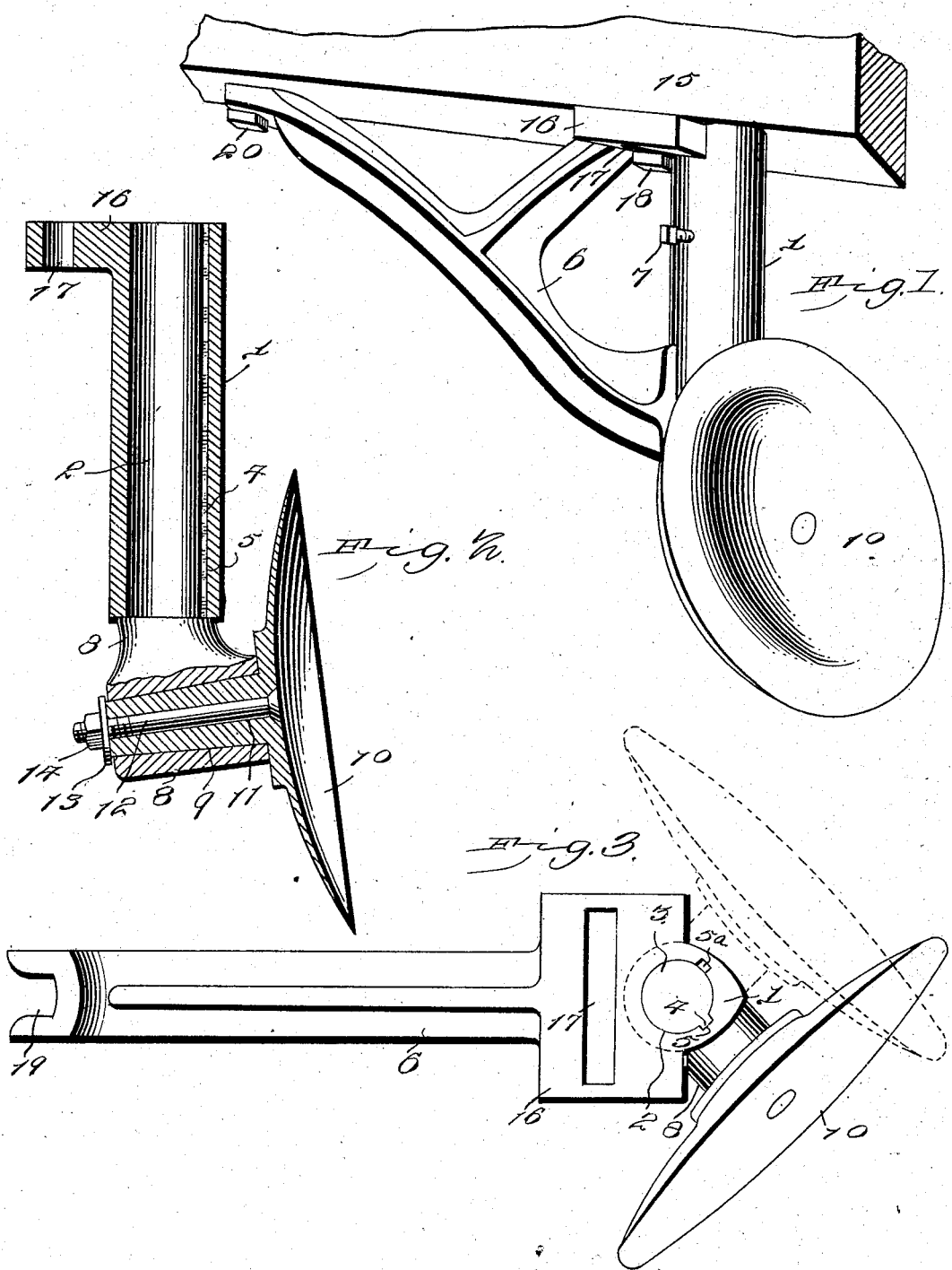

UNITED STATES PATENT OFFICE.

THOMAS LILLY BOLSER, OF INDIANAPOLIS, INDIANA, ASSIGNOR OF ONE-HALF TO CHAPIN WAGNER, OF INDIANAPOLIS, INDIANA.

DISK JOINTER FOR PLOWS.

SPECIFICATION forming part of Letters Patent No. 728,359, dated May 19, 1903.

Application filed July 12, 1902. Serial No. 115,304. (No model.)

*To all whom it may concern:*

Be it known that I, THOMAS LILLY BOLSER, a citizen of the United States, residing at Indianapolis, in the county of Marion and State of Indiana, have invented a new and useful Disk Jointer for Plows, of which the following is a specification.

This invention relates to jointers or colters for plows; and it has for its object to produce a disk jointer, sometimes also designated as a "rolling colter," which shall be simple in construction, effective in operation, capable of being applied to and successfully used in connection with any well-known pattern of plow, whether it be the old-fashioned moldboard type, walking or riding, or of the disk type.

A further object of my invention is to provide a device of this class which may be easily and quickly changed from "right" to "left," as may be requisite in accordance with the plow with which it is used.

A further object of the invention is to so construct the operating parts of the device as to insure strength, durability, and certainty of operation.

With these and other objects in view the invention consists in the improved construction, arrangement, and combination of parts, which will be hereinafter fully described, and particularly pointed out in the claims.

In the accompanying drawings, Figure 1 is a perspective view showing my invention applied in operative position to the under side of a plow-beam. Fig. 2 is a vertical sectional view of the device detached. Fig. 3 is a plan view with dotted lines indicating the reversed position of the disk or jointer.

Corresponding parts in the several figures are indicated by like characters of reference.

1 designates a stem or socket having a cylindrical bore 2 to receive a shank 3, which is cylindrical in shape, to engage the bore 2 of the socket and which is provided with a longitudinally-disposed rib 4, forming a key or feather, which is adapted to engage either one of two grooves 5 and 5ª, formed longitudinally in said bore, in which the said shank may thus be held securely against rotation therein, while at the same time its position may readily be changed from that shown in full lines to that shown in dotted lines in Fig. 3 of the drawings. The stem or socket 1 is to be suitably attached to or connected with a bracket or hanger 6, by means of which it may be secured in operative position to the beam or frame of the plow in connection with which it is to be used. Preferably the stem or socket is cast in one piece with such bracket or hanger, and the shape of the latter may be changed in any manner desired that may be found requisite to adapt it to peculiar makes of plow beams or frames, as will be readily understood. The shank 3, which is inserted into the socket from the under side of the latter, may be retained in the said socket by means of a set-screw 7, which, if desired, may be pointed at its inner end in order to give it a grip upon said shank. The shank is provided at its lower end with a box or bearing 8, which is preferably tapered, as clearly shown in Fig. 2, to engage the correspondingly-tapered journal 9 of the jointer 10. The latter consists of a concavo-convex disk, which is cast or otherwise formed in one or more pieces with the said tapered journal 9, which extends centrally from the convex side of said disk. The journal 9, as well as its boxing 8, is preferably chilled to increase the life of these, which are the principal wearing parts of the device. The journal 9 is bored longitudinally, as shown at 11, to receive a bolt 12, the head of which engages and is flush with the outer concave side of the disk 10. The threaded end of the bolt receives a washer 13 and nut 14, whereby the parts of the device are retained in operative position with relation to each other. The bore of the boxing 8 is preferably slightly inclined in addition to being tapered, as will clearly appear by reference to Fig. 2. This is in order to impart to the disk or jointer 10 the desired tilt, the lower edge of said disk being thereby thrown in an outward or forward direction.

The type of hanger or bracket which has been shown at 6 in the drawings is specially adapted to be used in connection with the beam of an ordinary walking-plow, such beam having been indicated at 15 in Fig. 1 of the drawings. The bracket 6 is here provided at its front end with an enlargement 16, having a transverse slot 17 to receive a connecting-bolt 18, and the rear end of said bracket is provided with a recess 19 to receive a bolt 20. By this means the bracket or hanger carrying the jointer may be adjusted so as to present the jointer at the angle which shall be found most advantageous to enable it to perform its work in the most effective manner.

From the foregoing description, taken in connection with the drawings hereto annexed, the operation of my invention and its advantages will be readily understood by those skilled in the art to which it appertains. It has already been stated that the jointer may be used in connection with all the well-known types of plows by simply providing for its attachment to the beam or frame of such plows in such a manner that its position shall enable it to perform the work for which it is intended—namely, cutting a strip of sod in advance of the plow proper and turning it into the furrow, thus making it vastly easier for the large plow to cut and turn the sod. The operation of turning the sod which has never been successfully performed by disk plows of ordinary construction, however effective such plows may otherwise have been, may be successfully performed when my improved disk-jointer is used in connection therewith. The facility with which my improved disk jointer may be adjusted to enable it to be used in connection with either right or left hand plows is an advantage of no little importance.

I desire it to be understood that I do not limit myself as regards the detailed construction of the device, and especially of the hanger for the same, which has been shown in the accompanying drawings, inasmuch as many departures might be made from said construction without departing from the spirit or scope of my invention. I accordingly reserve the privilege of making any such modifications as may be resorted to within the scope of my invention.

Having thus described my invention, I claim and desire to secure by Letters Patent of the United States—

1. A disk jointer having a journal integral therewith, in combination with a shank having a box bored to receive said journal, and a socket to receive said shank, the latter being provided with means for locking it against rotation in said socket at various points of adjustment, substantially as set forth.

2. In a device of the class described, the combination with an axially-adjustable shank having a tapered boxing, of a disk jointer having an integral tapered journal, longitudinally bored, a connecting screw-bolt extending through said bore and having its head flush with the concave side of the jointer, and fastening means upon the threaded end of said screw-bolt, abutting against the edge of the boxing in which the journal is mounted, substantially as set forth.

In testimony that I claim the foregoing as my own I have hereto affixed my signature in the presence of two witnesses.

THOMAS LILLY BOLSER.

Witnesses:
PERRY D. EVANS,
JOHN M. PIETZUCH.